(12) United States Patent
Kang (10) Patent No.: US 7,133,691 B2
(45) Date of Patent: Nov. 7, 2006

(54) PORTABLE PHONE WITH CAMERA

(75) Inventor: Jae Soon Kang, Kyonggi-do (KR)

(73) Assignee: LG Electronics Inc., Seoul (KR)

(*) Notice: Subject to any disclaimer, the term of this patent is extended or adjusted under 35 U.S.C. 154(b) by 265 days.

(21) Appl. No.: 10/161,905

(22) Filed: Jun. 4, 2002

(65) Prior Publication Data

US 2002/0187818 A1 Dec. 12, 2002

(30) Foreign Application Priority Data

Jun. 12, 2001 (KR) .............................. 2001-32865

(51) Int. Cl.
*H04M 1/00* (2006.01)
(52) U.S. Cl. .............. 455/556.1; 455/575.3; 348/14.01; 379/433.13
(58) Field of Classification Search ......... 455/556.1, 455/550.1, 575.1, 575.3, 575.8; 348/14.01–14.16; 379/433.13
See application file for complete search history.

(56) References Cited

U.S. PATENT DOCUMENTS 5,259,019 A 11/1993 Stilley
5,491,507 A 2/1996 Umezawa et al.
5,832,080 A 11/1998 Beutler et al.

FOREIGN PATENT DOCUMENTS

| EP | 0 898 405 A2 | 2/1999 |
|---|---|---|
| EP | 1 096 771 A1 | 2/2001 |
| JP | 11-069214 | 3/1999 |
| JP | 2000-253113 | 9/2000 |
| JP | 2000-253124 | 9/2000 |

*Primary Examiner*—Lee Nguyen
(74) *Attorney, Agent, or Firm*—Lee, Hong, Degerman, Kang & Schmadeka (57) ABSTRACT

A portable telephone with a camera is disclosed, in which a functionality of a camera being rotated to an object in any desired rotational angle without a main body turned around. The portable telephone comprises a main body having a control panel installed on a front face of the main body and a rotation-support part formed in an upper end of the main body, a folder having a display panel and a speaker installed on a front face of the folder and having a connecting part formed in a low end of the folder, the connecting part being rotatably coupled to outer sides of the rotation-support part, and a camera module being rotatably coupled to inner sides of the rotation-support parts.

27 Claims, 6 Drawing Sheets

PORTABLE PHONE WITH CAMERA

CROSS-REFERENCE TO RELATED APPLICATIONS

This application claims the benefit of Korean Application No. P2001-32865, filed on Jun. 12, 2001, which is hereby incorporated by reference as if fully set forth herein.

BACKGROUND OF THE INVENTION

1. Field of the Invention

The present invention relates to a portable telephone with a built-in camera, and more particularly, to a portable telephone with a camera having a rotatable lens which enables users to aim an object in a desired rotational angle as wide as possible.

2. Discussion of the Related Art

In general, Portable telephones include cellular phones or Personal Communication Systems (PCS) having wireless communication capabilities. Nowadays as the need of video/image communication emerges, as well as voice communication, a portable telephone with a camera can be suggested to satisfy this demand.

Figure 1:
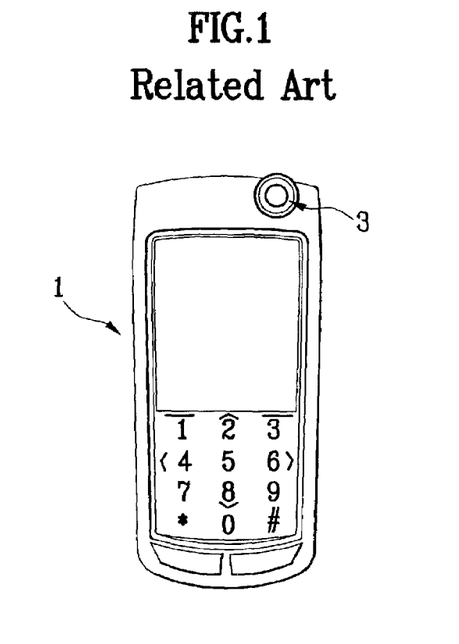
FIG. 1 to FIG. 3 illustrate front views of conventional portable telephones with a camera.

By considering FIG. 1, a conventional portable telephone with a camera can be described as follows. Inside of a main body 1 of the portable telephone, a camera 3 is mounted on the fixed location of an upper body. This type of portable telephone with a camera is unable to aim an object with any various angles without rotating a whole body, since the camera lens is formed into an embody of a portable telephone. For instance, since the camera lens is always facing out in the same direction of a LCD from the main body 1, users cannot aim a lens toward an object on the other side while they're looking at the LCD. Therefore in order to shoot an object on the other side (in the opposite direction of a LCD face), the main body 1 of a portable telephone needs to be turned around. Afterwards, users cannot check an aiming position of the camera lens, since not being able to look at the LCD on the main body. In short, by facing the main body out of users' side, they're unable to look at the image of pictures through the LCD panel such as a viewfinder of a camera. And also once it is turned around, it is hard to use function keys on a control panel. This leads to one of drawbacks.

Figure 2:
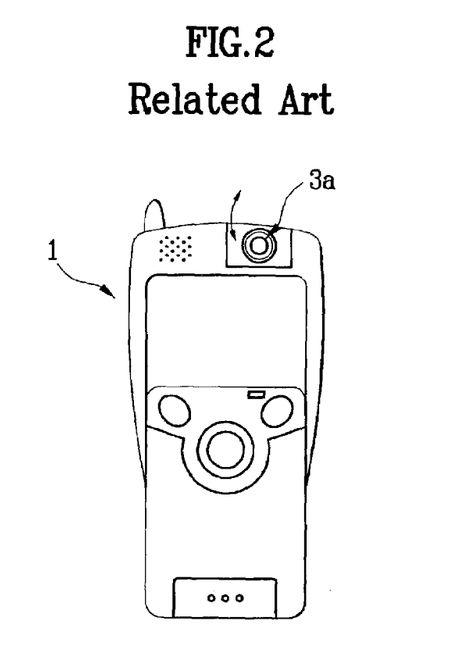

FIG. 2 illustrates another example of conventional portable telephones with a camera. In an upper end of a main body 1 of this portable telephone, a camera lens 3a is installed separated from the main body 1. In this case, this camera can only rotate with limited angles, for instance rotating up and down in a sense. This type of portable telephone with a camera gives a limitation such that it rotates in narrow angles. Since even the camera lens is exposed and sticks out on the edge of the main body 1, it is quite easy to be damaged and contaminated.

Figure 3:
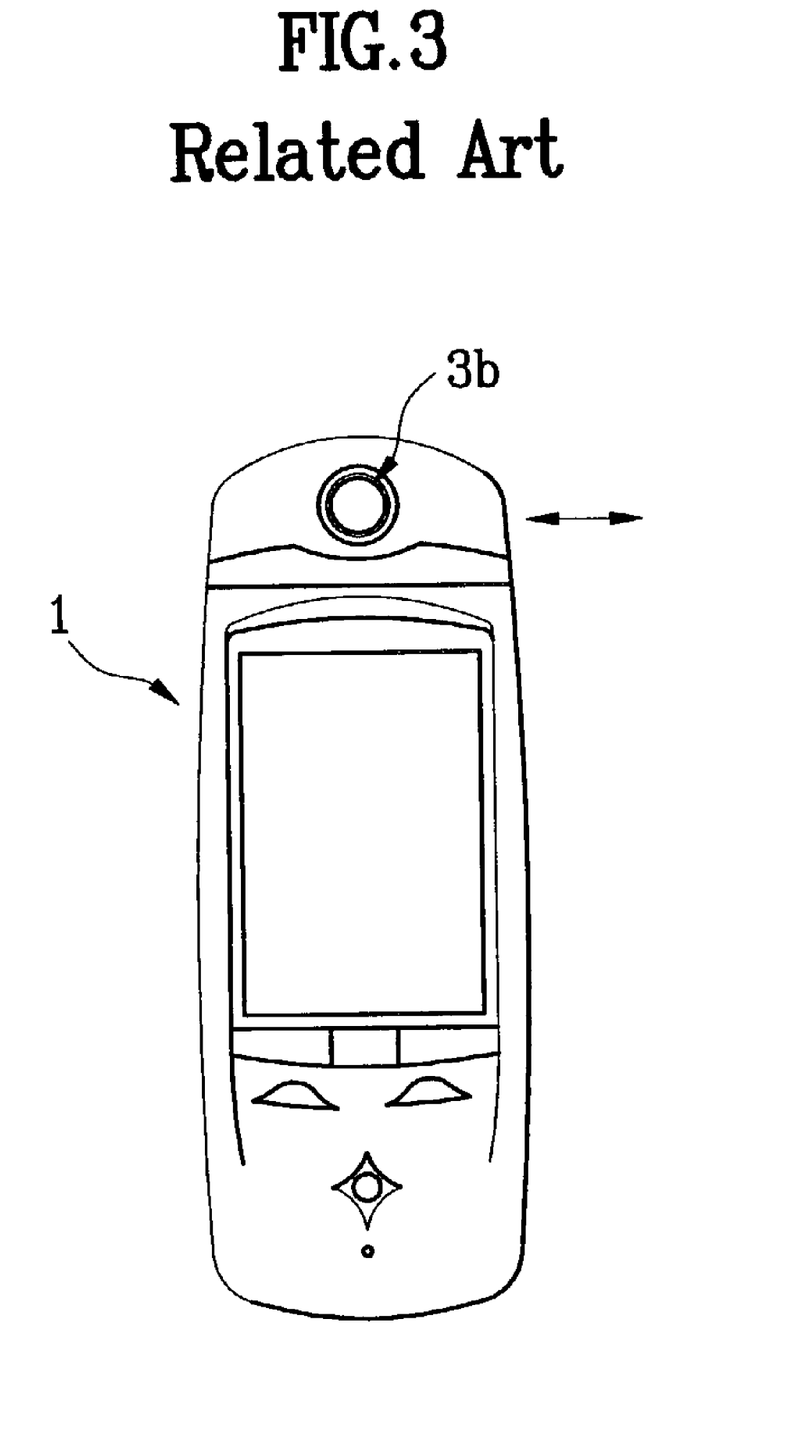

FIG. 3 illustrates another example of conventional portable telephones. In FIG. 3, a camera is mounted on an upper end of a main body. This camera rotates only on a horizontal axis. In this case, not being capable of rotating on a vertical axis (front to back of the main body 1), the horizontal rotational movement of camera doesn't give enough angles to shoot an object in a desired position. Unfortunately this type of camera on a portable telephone could not solve the problem in the previous example, such as easily damaged and contaminated of a camera lens.

SUMMARY OF THE INVENTION

Accordingly, the present invention is directed to a portable telephone with camera that substantially obviates one or more problems due to limitations and disadvantages of the related art above.

An object of the present invention is to provide a portable telephone with a camera having a wide rotational angle of shooting an object in a front to back side of the portable telephone.

Another object of the present invention is to provide a portable telephone with camera whose installation is more protective from the damage and contamination.

In order to achieve the purpose of this invention mentioned above, a portable telephone with a camera includes a main body having a control panel installed on a front face of the main body and a rotation-support part formed in an upper end of the main body, a folder having a display panel and a speaker installed on a front face of the folder and having a connecting part formed in a low end of the folder, the connecting part being rotatably coupled to outer sides of the rotation-support part, and a camera module being rotatably coupled to inner sides of the rotation-support part.

Also, a rotation axis of the camera module is not placed on a rotational axis of the folder, the rotational axes not overlapping each other.

A hole for the folder, fitting a connecting part of the folder, is formed outside of the rotation-support part and A hole for fitting the camera module is formed inside of the rotation-support part for rotational movements. Herein, inside of the rotation-support part and the connecting part are formed by air gap wherein flexible cables are installed. In addition, the camera module is formed as a cylindrical shape having 360-degree rotational movements. Both sides of the camera module are formed by a rotation axis, desirable, having at least one of those rotation axes an air gap.

According to an implementation of the present invention, a method of lock-in position is installed, between the camera module and the rotation-support part, fixing the camera module in a desired position. The method of lock-in position installed on one side of the camera module comprises an elastic sub-part producing an elasticity caused by being rotated simultaneously with the camera module; and a bushing fixed inside of the rotation-support part producing a strength to transform the elasticity when the camera module rotating.

A surface of the elastic sub-part has a shape of plate formed by a protrusion. And one side of the elastic sub-part is cut open in order to rotate with an embodied of the camera module. A circumference of the elastic sub-part is partially cut open for being rotated as an embodied with the camera module and one side of the camera module is formed by a first concave part fitting the elastic sub-part, the first concave part matched with a shape of the elastic sub-part. And also some area of the first concave is subsided more, desirably to form second concave part.

On the other hand, the bushing consists of: a contacting part of a plate and a boss as an embodied of the contacting part, the rotation-support part formed by a subsided connecting part, a contacting part of the bushing settled down in the connecting part, and the boss fit in a hole for the camera module. In addition, a contacting part of the bushing is desirable to form grooves fitting to the protrusion of the elastic sub-parts. And in order for the bushing to be fixed on the rotation support parts, both sides of the contacting part is cut open and a connecting part of the rotation-support part is supposed to be formed as roughly identical shape as the contacting part. Therefore according to the present invention, a camera module of this portable telephone can be rotated freely and set depending on the location of an object. And also it could prevent a camera lens from damage or contamination besides a wide rotational angle of the camera module.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 4:
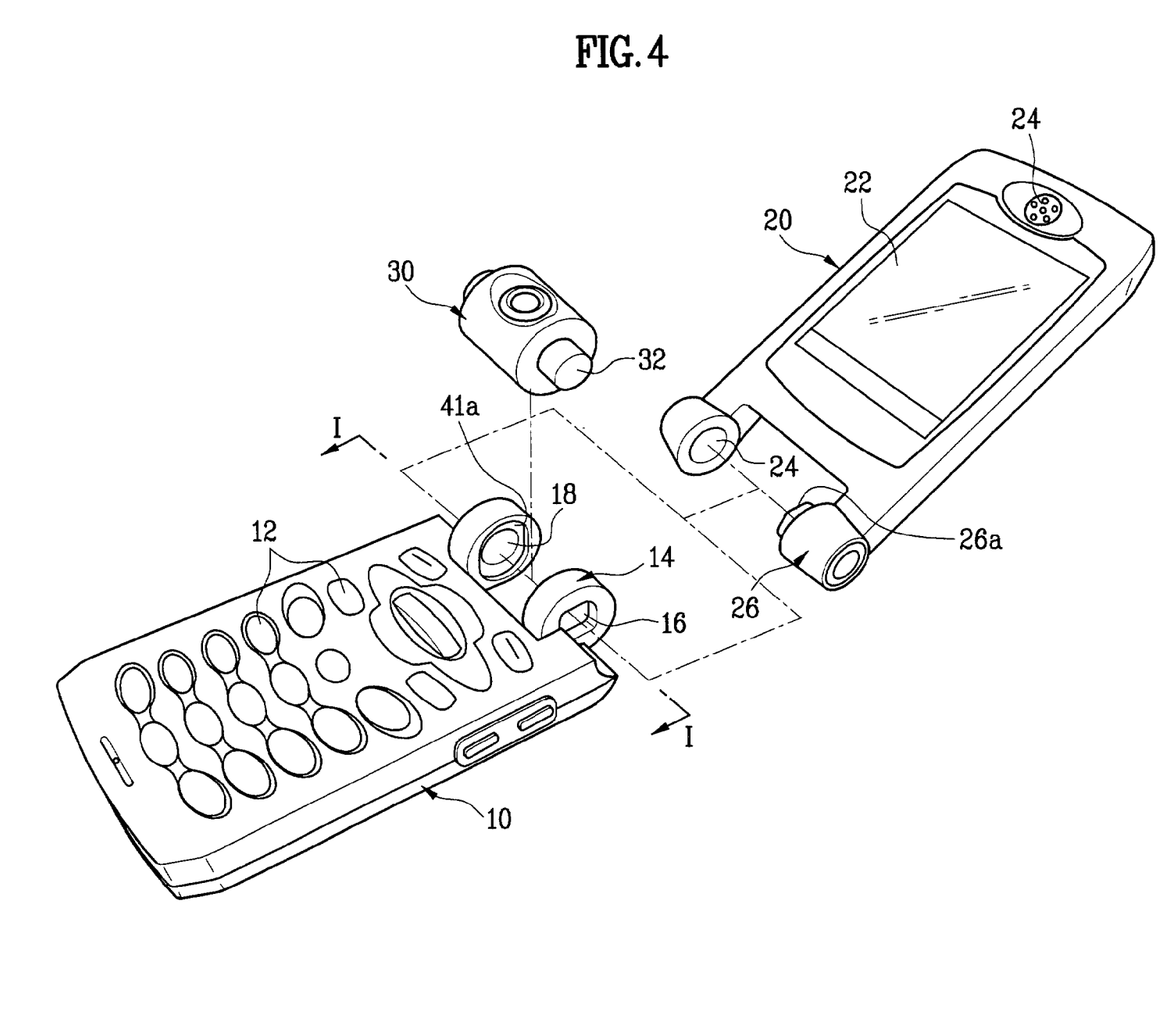
FIG. 4 illustrates an explored perspective view of a portable telephone with a camera according to the present invention as a rough drawing.

In the below this portable telephone with a camera is described to meet the objectives by using appropriate examples in attached figures. By considering FIG. 4 to FIG. 6, a portable telephone according to the present invention includes a main body 10, a folder 20 coupled with the upper main body 20, and a rotatable camera module 30 mounted on the main body 10. In FIG. 4, a front end of main body 10 has a control panel (buttons and function keys) placed on. In an upper end of main body 10, there is a rotation-support part rotatably coupled to a camera module 30. In a front end of the folder 20, a speaker and a display panel such as LCD are installed. In a lower end of the folder 20, a connecting part 26 is rotatably coupled to the rotation-support part 14. And there is a rotational axis 32 inserted into both sides of the camera module 30. Herein, it is desirable for rotation-support parts 14, a connecting part 26 and a rotation axis 32 of camera module 30 being installed as a pair.

Figure 5:
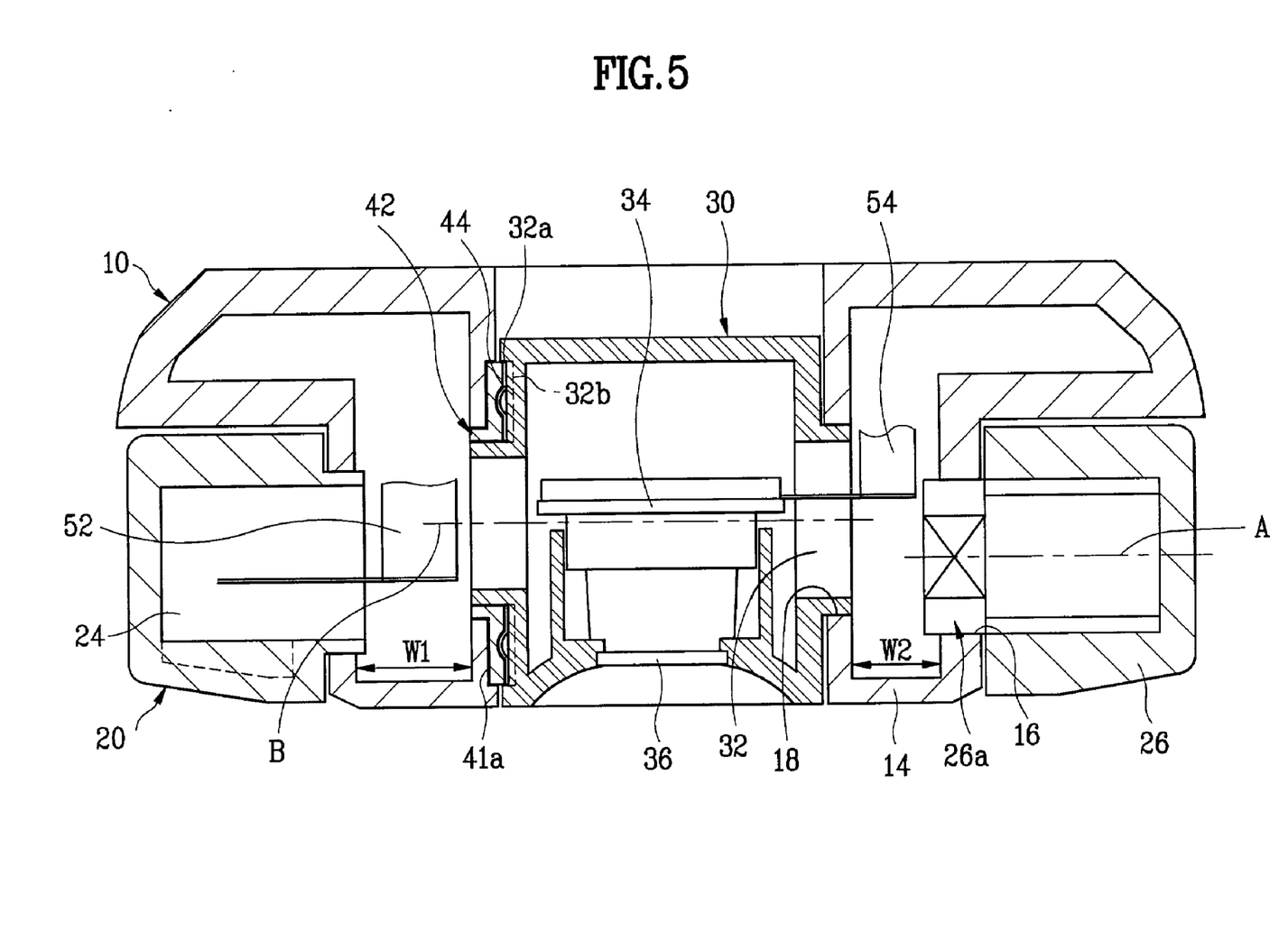
FIG. 5 illustrates a cross-sectional view of the portable telephone shown in FIG. 4.

On the other hand, the folder 20 is coupled outside of the rotation-support part 14 on the main body 10. The camera module 30 is coupled inside of the rotation-support part 14 rotating separated from the folder 20 to outside of the rotation-support part 14. As seen in FIG. 5, it is desirable for folder 20 and camera module 30 to have two different alignments of rotation axes. The reason is that the general application of the folder 20 versus a camera module might need different rotational angle. Therefore, it is necessary that the folder 20 and the camera module 30 can rotate separately with respect to a main body 20. Since the camera module 30 can rotate in 360 degrees angle on a rotational axis of the rotation-support part 14, users can aim the camera module 30 in any desired angle to an object being shot.

Now, the details regarding an assembly structure of a main body 10, a folder 20, and a camera module 30 are explained explicitly as below. First of all, as described above, the lower end of the folder 20 has a pair of connecting parts 26. Inside of a pair of the connecting parts 26, an air gap 24 is placed as desirable. In at least one of a pair of connecting parts 26, a hinge element 26a is installed to have an easy access on folding and unfolding the folder. And also the other air gap 24 of connecting part 26 becomes a space for cables from a circuitry. In short, the air gap 24 is used as a space for flexible cables 52 of data signal to be connected between the display panel and the main body 10.

In camera module 30, there are an image sensor 34 receiving image signals, flexible cables transmitting image signals to a main board of the main body 10 in the image sensor. And also there is a transparent window 36 installed on a surface of the camera module 30. The camera module 30 has a cylindrical shape coordinated to rotate in full 360 degrees angle. It is desirable that at least one of rotation axes 32 could be made as an axis of an air gap placed on both sides of the camera module. Through the axis of an air gap, flexible cables 54 are connected from image sensor 34 to main board of the body 10.

As described above regarding the main body 10, there is a pair of the rotation-support parts. The rotation-support part 14 is placed either in parallel with or in a certain angle with respect to body 10. In other words, a rotation axis of the rotation-support part 14 is located upward or downward with respect to a front side of the main body 10. Outside of the rotation-support part 14, there is a hole for the connecting part 16. The hole for the connecting part 16 is a place wherein a rotation axis of the hinge element 26a is rotatably coupled. Inside of the rotation-support parts 14, there is a hole for the camera module 18 wherein a rotation axis of the camera module 30 placed and assembled. In addition, an air gap of inside of rotation-support part 14 placing some widths of W1 and W2 is used as a space to connect flexible cables 52, 54 with a main board of the main body 10.

On the other hand, it is desirable for camera module 30 not to be too loose to rotate itself. The camera module should be fixed firmly in any desired angle after users rotate it. Eventually, it is necessary to locate a camera module 30 being rotated in any aiming angle and fixed subsequently by users, which is a role of method of lock-in position.

A method of lock-in position can be described as below. The method of lock-in position is installed in the location between the rotation-support part 14 of the main body 10 and the camera module 30. The method of lock-in position includes an elastic sub-part 44 producing an elasticity (latitudinal sustainability) transformed by a rotation of the camera module 30, and a bushing 42 transforming the elastic sub-part 44 with fixed on inside of the rotation-support parts 14 of the main body 10.

More details are explained as follows. A bushing 42 consists of a roughly plate shape of contacting part 41 and a boss 43 formed to a single body with the contacting part 41. The rotation-support part 14 is formed by a subsided connecting part 41a and the contacting part 41 of the bushing 42 settles down in the connecting part 41a. Then, the boss 43 is inserted and assembled in a hole for the camera module 18. It is necessary that a rotation of the bushing 42 should not interfere with a rotational movement of the camera module 30. Definitely, the bushing 42 could be fixed on the rotation-support part by using an adhesive, however the consideration of a convenient assembly should be taken into account. In order to overcome this hindrance, it is necessary for the contacting part 41 of bushing 42 to be a non-circular shape. For instance, both sides of the contacting part 41 of bushing 42 are cut open and connecting part 41a of the rotation-support part 14 is supposed to have such a shape that matches with a shape of cut-open bushing 42.

On the other hand, an elastic sub-part 44 is desirable to have a rough circular-plate shape formed by a protrusion 44a toward the bushing 42. With this set-up, the camera module cannot be rotated by itself due to the fact that the protrusion 44a of the elastic sub-part 44 compressed and transformed by bushing 22 producing an elasticity aside. However, even if it can prevent the camera module from rotating by itself, the camera module 30 is incapable of being fixed in a designated position defined by users. Therefore, it is desirable for the bushing 42 to form a few grooves matched to the protrusion 44a on the side of touching the elastic sub-part in a contacting part 41. Once a few grooves are formed described above, the camera module 30 can be fixed firmly in the desired rotational angle where the protrusion 44a of the elastic sub-part 44 are fit into the grooves.

Whereas, the elastic sub-part 44 should rotate in a single body with the camera module 30. So the elastic sub-part 44 can be fixed on the camera module 30 by using adhesives, but the consideration of a convenience in assembly should also be taken into account. That is, the elastic sub-part 44 should be a non-circular shape. For example, as described in FIG. 7, both sides of the elastic sub-part are cut open with some parts C. Then, one side of the camera module 30 is formed by a first concave part matching a shape of the elastic sub-part 44 to be fit in. Once this process is done, the elastic sub-part 44 can rotate in a single body with the camera module. Furthermore, some parts of the concave part 32a become much subsided, so that a second concave part 32b is formed being capable of transforming the elastic sub-part 44.

The procedure of a described method of lock-in position is as follows. Once the protrusion 44a of an elastic sub-part 44 are initially fit into the grooves of bushing 42, the camera module 30 is on a mode of a fixed rotational angular position. Afterwards, users might need to adjust a camera-aiming angle of shooting an object by rotating it. With this action, it makes the elastic sub-part and the camera module rotate in a single body simultaneously. As a result, the protrusion 44a of the elastic sub-part 44 results comes off from the grooves in the bushing 42. And then, the protrusion 44a of the elastic sub-part 44 are moved on the flat plane area where there are no grooves on the bushing 42, so that the protrusion 44a are compressed. As soon as they are compressed, an effect of transformation occurs. Then, the sustainability along a side can be generated as much as the transformation occurred. At this time, the second concave part 32b, formed on the side of the camera module 30, plays a role in keeping no resistance against the transformation of the elastic sub-part 44. By rotating camera module 30 continuously, the protrusion 44a get fit into next adjacent grooves via flat plane area. This results in locking in a next desired rotational angular position. As mentioned above, camera module 30 does not rotate by itself due to being locked in a desired rotational angular position, when the protrusion 44a of the elastic sub-part gets fit into the grooves 42a of the bushing 42. Considering rotational angular positions to be firmly locked in, it is desirable to have a corresponding number of grooves 42a to be formed. In addition, a pair of the protrusions 44a on the elastic sub-part 44 are formed in a symmetrical pattern described in FIG. 7. And also, the grooves 42a formed on the bushing 42 should have a corresponding number of pairs to match with the protrusion 44a. And also, by spacing grooves on the bushing 44, rotational angular movements between adjacent grooves can be varied for locking in rotational positions of the camera module 30.

Figure 6:
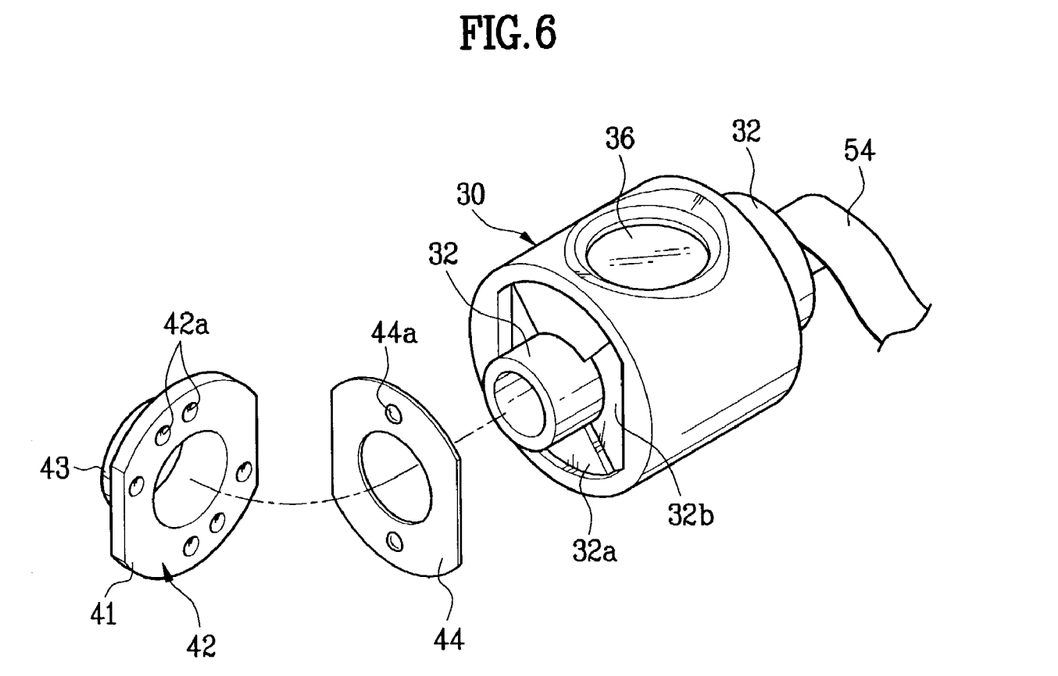
FIG. 6 illustrates an exploded perspective of the camera module shown in FIG. 4.
Figure 7:
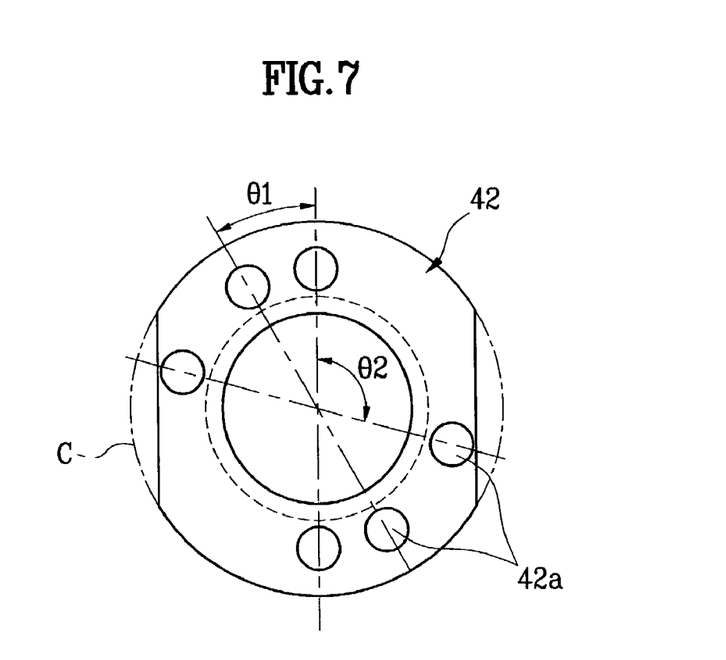
FIG. 7 illustrates a front view of a bushing shown in FIG. 6.

FIG. 6 and FIG. 7 show one example of designing camera module. That is, a pair of the protrusions 44a are formed in the elastic sub-part 44 and three pairs of grooves are formed in the bushing 42. Besides, an angle theta 1 between a reference groove and the next adjacent one in counterclockwise is approx. 30 degrees and an angle theta 2 between the reference and the next adjacent one in a clockwise is approx. 120 degrees. Therefore, a user can flip the folder and set the camera module 30 fixed on a first rotational position after rotating it in a 30 degree counterclockwise. In a clockwise direction, camera module 30 can be fixed on a first rotational position after being rotated in 120 degrees. A rotational angle of adjacent grooves on the bushing is varies by the number of grooves formed on it. Practically they can be modified for a design consideration.

Figure 8:
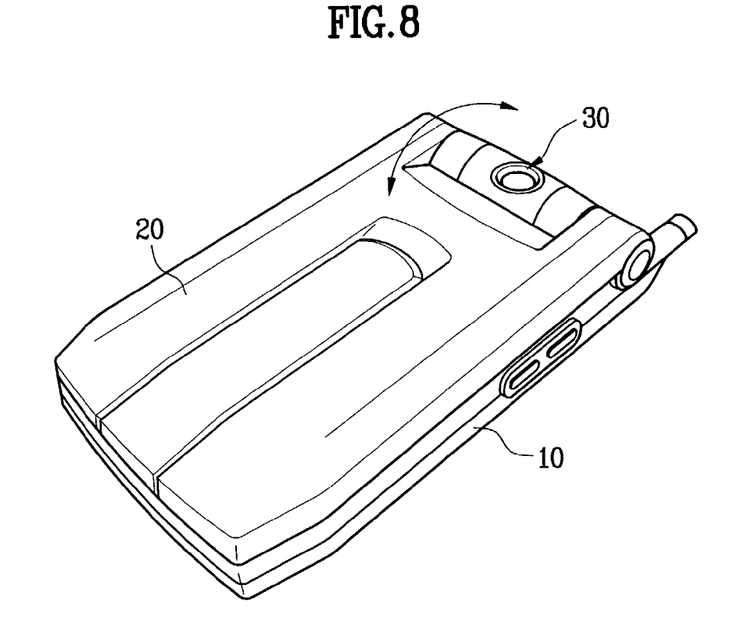
FIG. 8 illustrates a perspective view of the portable telephone with a camera having a folder closed according to the present invention.
Figure 9:
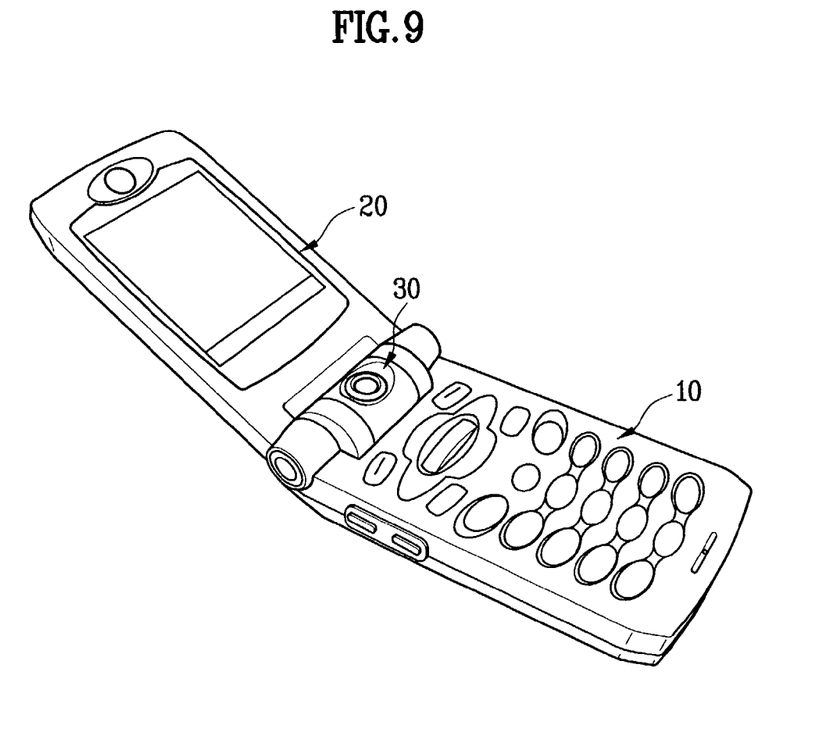
FIG. 9 shows a perspective view of the portable telephone with a camera having a folder open according to the present invention.

FIG. 8 and FIG. 9 illustrates a portable telephone with a camera by this present invention. First of all, according to this invention, since a camera module has full 360 degree rotational movements relatively with respect to a main body, users can shoot an object in any angular position by rotating the camera module itself, instead of turning a whole body of a portable telephone on an image calling or a regular picture-taking mode. Eventually, an image calling by this portable telephone becomes more handy and particularly in taking a picture. Since the camera module, aimed toward an object to be shot, can be rotated over the below of the flipped folder (the camera lens is facing out of a back side of the main body), a display panel on a front side can also be used as a- viewfinder of camera such as a conventional digital camera. Therefore, users can watch how a picture can be being taken through a display panel when they try to shoot an object at the same time. And secondly, the camera module is located between rotation-support parts of the main body. Precisely, both a left and a right side of the camera module, supported by the main body are more protective than others. Consequently the usage of this portable phone with camera is very durable and reliable against external impacts. Thirdly, according to the present invention, the camera module can be rotated in such an angle that the lens cannot be exposed from outside when users are carrying it or not using it. So this portable telephone has an advantage of resistances of damaged and contaminated on the camera lens, since it can be faced down into the main body. Therefore, it also prevents a picture quality from contaminated due to damage or scratch of a window of the camera module.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A portable telephone with a camera comprising:
   a main body having a control panel installed on a front face of said main body and a rotation-support part formed in an upper end of said main body;
   a folder having a display panel and a speaker installed on a front face of said folder and having a connecting part formed in a low end of said folder, said connecting part being rotatably coupled to outer sides of said rotation-support part; and
   a camera module being rotatably coupled to inner sides of said rotation-support parts;
   wherein a rotational axis of said camera module is inserted not being aligned with a rotating axis of said folder.

2. The portable telephone in claim 1, wherein a hole for said folder, fitting a connecting part of said folder, is formed outside of said rotation-support part and a hole for fitting said camera module is formed inside of said rotation-support part for rotational movements.

3. The portable telephone in claim 2, wherein inside of said rotation-support is formed with an air gap providing a space for flexible signal cables to be installed.

4. The portable telephone in claim 2, wherein inside of said connecting part is formed with an air gap which provides a space for flexible signal cables to be installed.

5. The portable telephone in claim 2, wherein said camera module made as a roughly cylindrical shape is capable of being rotated in full 360 degrees and at least one of rotational axes installed on both sides of said camera module is formed with air gap inside.

6. A portable telephone with a camera comprising:
   a main body having a control panel installed on a front face of said main body and a rotation-support part formed in an upper end of said main body;
   a folder having a display panel and a speaker installed on a front face of said folder and having a connecting part formed in a low end of said folder, said connecting part being rotatably coupled to outer sides of said rotation-support part; and
   a camera module being rotatably coupled to inner sides of said rotation-support parts;
   wherein a camera position fixing unit, located between said camera module and said rotation-support part, is provided to fix said camera module in a desired rotational position;
   wherein said camera position fixing unit, installed on one side of said camera module, comprises an elastic sub-part producing an elasticity caused by being rotated simultaneously with said camera module and a bushing fixed inside of said rotation-support part producing a strength to transform said elasticity when said camera module rotating.

7. The portable telephone in claim 6, wherein one side of said elastic sub-part has a protrusion formed as a plate shape.

8. The portable telephone in claim 7, wherein a circumference of said elastic sub-part is partially cut open for being rotated as an embodied with said camera module and one side of said camera module is formed by a first concave part fitting said elastic sub-part, said first concave part matched with a shape of said elastic sub-part.

9. The portable telephone in claim 8, wherein some portion of said first concave part becomes more subsided resulting in a formation of a second concave part.

10. The portable telephone in claim 7, wherein said bushing comprises a roughly plate shape of a contacting part and a boss as an embodied of said contacting part, said rotation-support part formed by a subsided connecting part, a contacting part of said bushing settled down in said connecting part, and said boss fit in a hole for said camera module.

11. The portable telephone in claim 10, wherein said contacting part of said bushing is formed by grooves matched with the protrusion on said elastic sub-part.

12. The portable telephone in claim 11, wherein a circumference of said contacting part of said bushing is partially cut open and said connecting part of said rotation-support part is almost identical to a shape of said contacting part, for having said bushing fixed on said rotation-support part.

13. A portable telephone with a camera comprising:
    a main body having a control panel installed on a front face of said main body and a rotation-support part formed in an upper end of said main body;
    a folder having a display panel and a speaker installed on a front face of said folder and having a connecting part formed in a low end of said folder, said connecting part being rotatably coupled to outer sides of said rotation-support part; and
    a camera module being rotatably coupled to inner sides of said rotation-support parts;
    wherein a hole for said folder, fitting a connecting part of said folder, is formed outside of said rotation-support part and a hole for fitting said camera module is formed inside of said rotation-support part for rotational movements;
    wherein said camera module made as a roughly cylindrical shape is capable of being rotated in full 360 degrees and at least one of rotational axes installed on both sides of said camera module is formed with air gap inside.

14. A portable telephone with a camera, comprising:
    a main body having a control panel installed on a front face of the main body;
    a folder having a display panel;
    a connector for connecting the main body to the folder allowing the folder to rotate with respect to the main body;
    a rotation-support part installed at sides of the connector for supporting rotation of the folder; and
    a camera module rotatably installed at inner sides of the rotation-support part, wherein a rotating axis of the camera module allows the camera module to rotate separately from a rotating axis of the folder.

15. The portable telephone of claim 14, wherein the connector connects the main body to the folder such that the relative position between the main body and the folder is changeable.

16. The portable telephone of claim 14, wherein the connector is extended from the folder.

17. The portable telephone of claim 14, wherein the rotation-support part is extended from the main body and installed at outer sides of the connector.

18. The portable telephone of claim 14, wherein the camera module is coupled to inner sides of the connector.

19. The portable telephone of claim 14, wherein the camera module is capable of being fixed in a plurality of rotating angles.

20. The portable telephone of claim 19, wherein the camera module is capable of remaining fixed at the plurality of rotating angles when the folder is rotated to any position with respect to the main body.

21. A portable telephone with a camera, comprising:
a main body having a control panel installed on a front face of the main body;
a folder having a display panel;
a connector extended from the folder and connecting the main body to the folder allowing the folder to rotate with respect to the main body;
a rotation-support part extended from the main body and installed at sides of the connector for supporting rotation of the folder;
a camera module rotatably installed at inner sides of the rotation-support part; and
a camera position fixing unit operatively connected to the camera module for fixing the camera module in a plurality of rotating angles according to the rotation of the camera module.

22. The portable telephone of claim 21, wherein the rotation-support part is installed at outer sides of the connector.

23. The portable telephone of claim 21, wherein the camera module is coupled to inner sides of the connector.

24. The portable telephone of claim 21, wherein the camera module is capable of remaining fixed at the plurality of rotating angles when the folder is rotated to any position with respect to the main body.

25. The portable telephone of claim 21, wherein the camera position fixing unit is rotated with the camera module.

26. The portable telephone of claim 21, wherein the camera position fixing unit is installed at a side of the camera module.

27. The portable telephone of claim 21, wherein a rotating axis of the camera module allows the camera module to rotate separately from a rotating axis of the folder.

* * * * *